United States Patent
Momiyama (10) Patent No.: US 9,712,164 B2
(45) Date of Patent: Jul. 18, 2017

(54) SEMICONDUCTOR DEVICE AND DESIGNING METHOD OF SEMICONDUCTOR DEVICE

(71) Applicant: Socionext Inc., Yokohama-shi, Kanagawa (JP)

(72) Inventor: Yoichi Momiyama, Akishima (JP)

(73) Assignee: SOCIONEXT INC., Yokohama (JP)

( * ) Notice: Subject to any disclaimer, the term of this patent is extended or adjusted under 35 U.S.C. 154(b) by 74 days.

(21) Appl. No.: 14/719,180

(22) Filed: May 21, 2015

(65) Prior Publication Data

US 2015/0365089 A1   Dec. 17, 2015

(30) Foreign Application Priority Data

Jun. 11, 2014   (JP) .................................. 2014-120591

(51) Int. Cl.
*H03K 19/00* (2006.01)
*G06F 17/50* (2006.01)

(52) U.S. Cl.
CPC ..... *H03K 19/0013* (2013.01); *G06F 17/5072* (2013.01); *G06F 17/5081* (2013.01)

(58) Field of Classification Search
CPC ............ H03K 19/0013; G05F 17/5072; G05F 15/5081
USPC .......... 365/226, 145, 227, 65; 327/538, 543, 327/544

See application file for complete search history.

(56) References Cited

U.S. PATENT DOCUMENTS

| | | | | |
|---|---|---|---|---|
| 6,906,944 B2* | 6/2005 | Takeuchi | ................ | G11C 11/22 365/145 |
| 7,383,138 B2* | 6/2008 | Ito | ......................... | G06F 1/3203 702/60 |
| 8,055,924 B2* | 11/2011 | Koizumi | ............... | G06F 1/3203 710/260 |
| 8,073,643 B2* | 12/2011 | Ito | ......................... | G06F 1/3203 702/60 |
| 8,519,434 B2* | 8/2013 | Chen | ................... | H01L 27/0259 257/173 |
| 2004/0062115 A1* | 4/2004 | Takeuchi | ................ | G11C 11/22 365/202 |
| 2012/0193717 A1 | 8/2012 | Katakami et al. | | |

FOREIGN PATENT DOCUMENTS

| JP | 2007-294805 A | 11/2007 |
|---|---|---|
| JP | 2008-071925 A | 3/2008 |
| JP | 2012-160652 A | 8/2012 |

* cited by examiner

*Primary Examiner* — Dinh T Le
(74) *Attorney, Agent, or Firm* — Arent Fox LLP

(57) ABSTRACT

Out of a plurality of transistors, in a power switch which controls, for each logic block, a supply and an interruption of power with respect to the each logic block, each having a gate electrode connected to a well via a contact electrode, and a body region connected to a connection portion of the well with the contact electrode via a well resistor under an element isolation insulating film, and controlling a threshold voltage by changing an electric potential applied to the body region in accordance with a signal of the gate electrode, a plurality of first transistors and a plurality of second transistors which are different from the plurality of first transistors are made to have different delay characteristics from each other between the respective connection portions of the well with the contact electrodes and the respective body regions.

5 Claims, 6 Drawing Sheets

SEMICONDUCTOR DEVICE AND DESIGNING METHOD OF SEMICONDUCTOR DEVICE

CROSS-REFERENCE TO RELATED APPLICATION

This application is based upon and claims the benefit of priority of the prior Japanese Patent Application No. 2014-120591, filed on Jun. 11, 2014, the entire contents of which are incorporated herein by reference.

FIELD

The embodiments discussed herein are directed to a semiconductor device and a designing method of the semiconductor device.

BACKGROUND

In a semiconductor device such as LSI (Large Scale Integration) operable at a low voltage, for the purpose of reducing a power consumption by interrupting a power supply to a circuit block which is not used in the semiconductor device, a power gating technique which performs on/off control of the power with respect to the circuit block in accordance with a use state (presence/absence of use) of the circuit block is employed. In the power gating technique, a performance of power switch which switches whether or not the power supply is performed with respect to the circuit block (power domain) in the semiconductor device, is important.

For example, when a power supply with respect to a certain circuit block is started, there is a need to suppress a large current (inrush current) which flows momentarily when the power is turned on, in order not to exert an influence on another circuit block which is already operated. As a method of suppressing the inrush current, there is a method in which a plurality of stages of power switches are provided as illustrated in FIG. 11.

Figure 11:
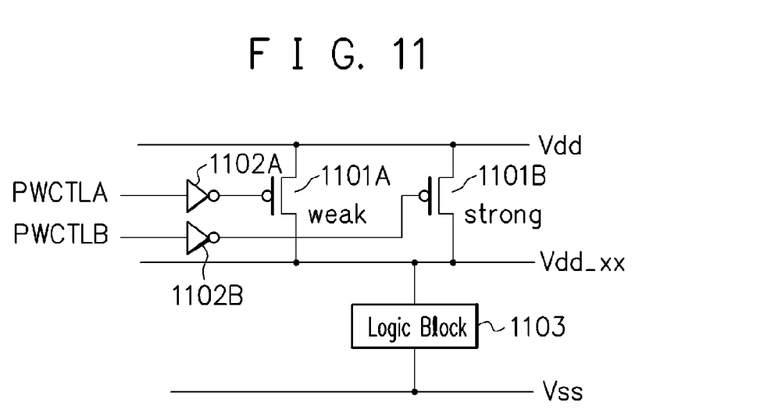
FIG. 11 is a diagram illustrating an example of power switches provided in a conventional semiconductor device.

FIG. 11 is a diagram illustrating an example of configuration of conventional power switches. There are provided a first power switch 1101A having a low (weak) capability of driving each logic block (circuit block, power domain) 1103, and a second power switch 1101B having a high (strong) capability of driving the logic block (circuit block, power domain) 1103. When a supply of power to the logic block 1103 is started, the second power switch 1101B is driven by being delayed with respect to the first power switch 1101A, with the use of control signals PWCTLA and PWCTLB supplied via inverters 1102A and 1102B, respectively. As described above, the first power switch 1101A is first turned into an on state to moderately supply the power to the logic block 1103, and thereafter, the second power switch 1101B is turned into an on state to supply, to the logic block 1103, the power with which the logic block 1103 can be normally operated, thereby suppressing the inrush current when the power is turned on.

Here, in a semiconductor device operable at a low voltage, an on-resistance of a transistor is large. If a size of the transistor is increased to reduce the on-resistance of the transistor, a circuit area is inevitably increased. As countermeasures against this, by using, as a transistor of a power switch, for example, a DtMOS (Dynamic threshold MOS) transistor driven by connecting a gate and a body region thereof, it is possible to suppress the increase in the circuit area while reducing the on-resistance. Further, when bodies of transistors are driven while providing a delay thereto, a driving in a plurality of stages as illustrated in FIG. 11 can be performed.

In order to realize the driving of the plurality of stages of the power switches as described above, the circuit area is increased since a control circuit (control function) for the power switches is provided. For example, there can be considered a method in which the control circuit is not provided, and it is designed to obtain RC delay by forming a resistor (R) by a wiring, a diffusion layer or the like, and with the use of a capacitance (C) such as a capacitance of a capacity cell, and a source-drain capacitance of a transistor of the power switch, to thereby drive the plurality of stages of the power switches while providing the delay thereto. However, to form the resistor for obtaining the RC delay by using the wiring, the diffusion layer or the like, is not realistic in terms of mounting, since an area becomes very large.

As a resistor in a semiconductor device, there is a well resistor made of a semiconductor region formed in a semiconductor substrate, for example (refer to Patent Documents 1 to 3 and the like, for example). Regarding the well resistor, a technique in which an increase in an area is suppressed by forming a polysilicon resistor, via an insulating region, on a well resistor formed in a semiconductor substrate, a technique in which a resistance value is controlled by changing an impurity concentration of SOI (Semiconductor On Insulator) layer, have been proposed.

Patent Document 1: Japanese Laid-open Patent Publication No. 2008-71925
Patent Document 2: Japanese Laid-open Patent Publication No. 2007-294805
Patent Document 3: Japanese Laid-open Patent Publication No. 2012-160652

SUMMARY

One aspect of a semiconductor device includes: a plurality of logic blocks in which a power supply thereto is controlled; and a plurality of power switches each of which controls, for each logic block of the plurality of logic blocks, a supply and an interruption of power with respect to the each logic block. Each power switch of the plurality of power switches includes a plurality of transistors arranged in parallel between the each logic block and a power line, each transistor of the plurality of transistors having a gate electrode connected to a well via a contact electrode, and a body region connected to a connection portion of the well with the contact electrode via a well resistor under an element isolation insulating film, and controlling a threshold voltage by changing an electric potential applied to the body region in accordance with a signal of the gate electrode. Out of the plurality of transistors provided in the each power switch, a plurality of first transistors and a plurality of second transistors which are different from the plurality of first transistors have different delay characteristics from each other between the respective connection portions of the well with the contact electrodes and the respective body regions.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, embodiments of the present embodiment will be described based on the drawings.

Figure 1A:
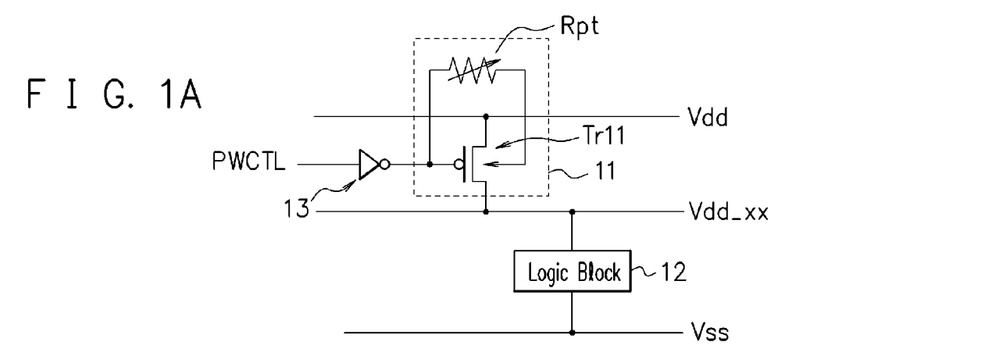
FIG. 1A is a diagram illustrating an example of configuration of a power switch provided in a semiconductor device in the present embodiment.

An example of configuration of a power switch provided in a semiconductor device in an embodiment will be described while referring to FIG. 1A to FIG. 1D. As illustrated in FIG. 1A, the semiconductor device in the present embodiment has a power switch 11 and a logic block (circuit block, power domain) 12.

The power switch 11 is provided with respect to each logic block 12, and controls a supply and an interruption of power with respect to the logic block 12 corresponding thereto. The power switch 11 is connected between a Vdd power line which supplies a power supply potential Vdd, and a Vdd_xx power line which supplies a power supply potential Vdd_xx to the logic block 12 corresponding thereto. The logic block 12 is connected between the Vdd_xx power line and a Vss power line which supplies a reference potential (for example, a ground potential) Vss. To the Vdd power line and the Vss power line, the power supply potential Vdd and the reference potential Vss are respectively and constantly applied from the outside.

Although illustrated schematically in FIG. 1A, the power switch 11 has a plurality of DtMOS (Dynamic threshold MOS) transistors Tr11 each capable of controlling a threshold voltage in a manner that a gate and a body region are connected to be driven, and an electric potential applied to the body region is changed. These plurality of DtMOS transistors Tr11 are connected between the Vdd power line and the Vdd_xx power line.

Each of the DtMOS transistors Tr11 has a source connected to the Vdd power line, a drain connected to the Vdd_xx power line, and a gate to which a control signal PWCTL is supplied via an inverter 13. By performing on/off control of the DtMOS transistors Tr11 with the use of the control signal PWCTL, the supply/interruption of the power with respect to the logic block 12 is controlled.

In the DtMOS transistor Tr11, the gate and the body region are connected via a well resistor Rpt under a partial trench in which an element isolation insulating film which partially isolates (which does not completely isolate) a well region in which the transistor is formed, is formed. Specifically, in the DtMOS transistor Tr11, the gate of the transistor and the well are connected by a contact electrode, and a connection portion of the well with respect to the contact electrode and the body region of the transistor are connected via the well resistor Rpt under the partial trench (element isolation insulating film). As will be described later, a delay characteristic between the contact electrode (connection portion of the well) and the body region, in other words, a delay characteristic (time constant) with respect to the body region when seen from the contact electrode, of each of the plurality of the DtMOS transistors Tr11 is not uniform, and there is a transistor having a different delay characteristic with respect to the body region when seen from the contact electrode, by thinning out and providing the contact electrode.

Figure 1B:
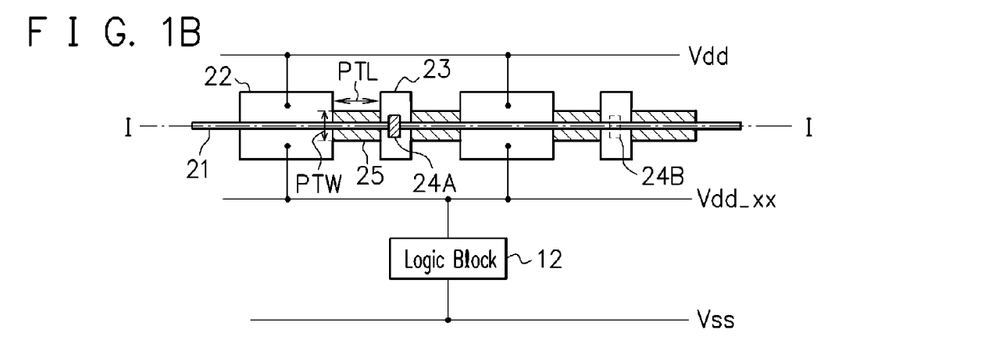
FIG. 1B and FIG. 1C are schematic sectional views each illustrating a structure of the power switch provided in the semiconductor device in the present embodiment.
Figure 1C:
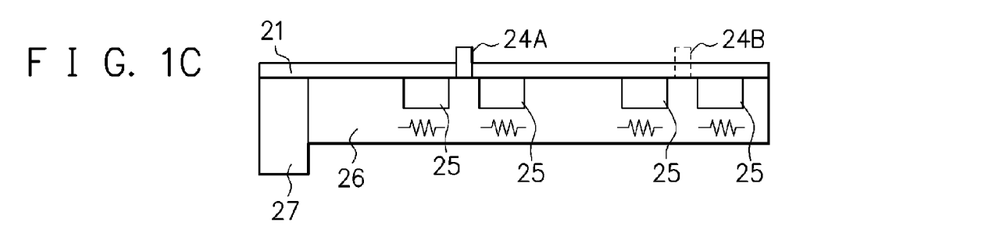
Figure 1D:
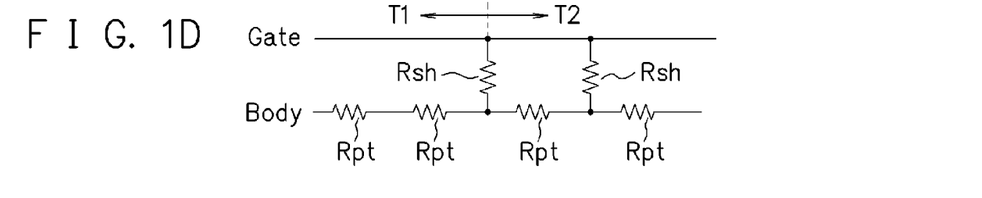
FIG. 1D is a diagram schematically illustrating resistance components in the semiconductor device in the present embodiment.

FIG. 1B is a schematic sectional view illustrating a structure of the power switch provided in the semiconductor device in the present embodiment, and FIG. 10 is a sectional view taken along the line I-I in FIG. 1B. In FIG. 1B and FIG. 10, 21 denotes a gate electrode, 22 denotes a region in which a source and a drain of a transistor are formed, and 23 denotes a region for disposing a contact electrode which connects the gate electrode 21 and a well 26 in which the transistor is formed.

24A denotes the contact electrode which connects the gate electrode 21 and the well 26 in which the transistor is formed. Note that in FIG. 1B and FIG. 10, in order to indicate that the contact electrode which connects the gate electrode and the well in which the transistor is formed can be selectively disposed, a contact electrode 24B which is not disposed is illustrated by a dotted line. 25 denotes an element isolation insulating film which is formed in a partial trench and which partially isolates (which does not completely isolate) the well 26 in which the transistor is formed, and 27 denotes an element isolation insulating film formed in a trench which completely isolates the well 26 in which the transistor is formed.

As illustrated in FIG. 1B and FIG. 1C, in the power switch in the present embodiment, a gate electrode and a body region of the transistor are connected via a well resistor (about 100 kΩ/□, for example) under the partial trench in which the element isolation insulating film 25 is formed. Accordingly, it is possible to form a resistor with a large resistance value while suppressing an increase in a circuit area, and it becomes possible that the body of the transistor is driven while providing a sufficient delay thereto with respect to the gate electrode. Further, since the delay in the driving of the body of the transistor is generated by the RC time constant between the resistance and the capacitance, an external control circuit (control mechanism) is not necessary, resulting in that the increase in the circuit area can be suppressed.

The resistance value of the well resistor under the partial trench can be adjusted by a width PTW and a length PTL of the element isolation insulating film 25 (partial trench), for example. Therefore, by appropriately setting the width PTW and the length PTL of the element isolation insulating film 25 (partial trench), it is possible to adjust a delay amount related to the driving of the body of the transistor with respect to the gate electrode.

Further, a position at which the contact electrode 24A which connects the gate electrode 21 and the well 26 in which the transistor is formed, is disposed is controlled, and some contact electrodes are thinned out to be disposed. Accordingly, as illustrated in FIG. 10, delay characteristics (time constants) in a resistor network formed of resistance components Rsh of the contact electrodes and the well resistors Rpt under the partial trenches are adjusted to make the delay characteristics with respect to the body regions of the transistors when seen from the contact electrodes to be different, resulting in that the driving of the bodies of the transistors at two or more of different time constants (T1, T2 illustrated in FIG. 1D, for example) can be realized.

Figure 2:
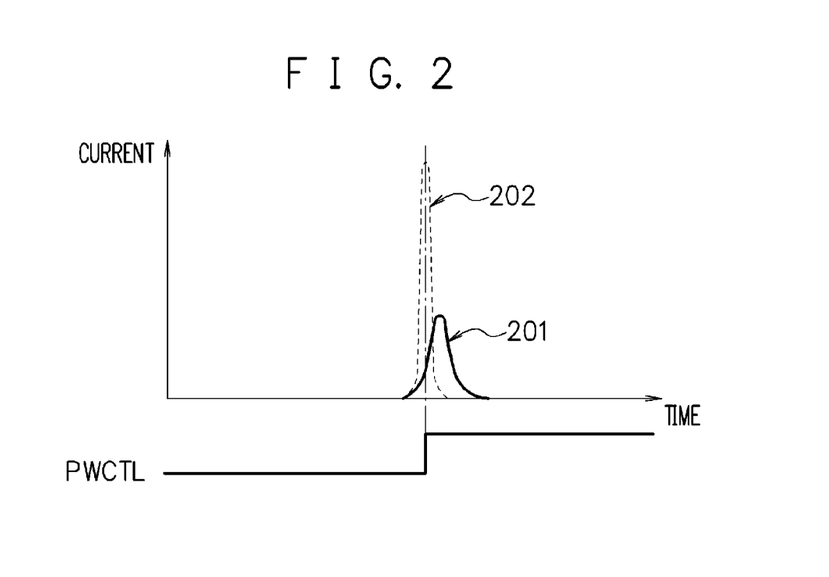
FIG. 2 is a diagram illustrating an example of an inrush current when the present embodiment is applied.

In a manner as described above, according to the present embodiment, by providing the time difference to the change in the threshold voltage caused by the change in the body potential among the plurality of the DtMOS transistors Tr11 provided in the power switch 11, it is possible to suppress an increase in an amount of current (inrush current) 201 which flows when the power with respect to the logic block 12 is turned on as illustrated in FIG. 2. As is apparent from the comparison between the amount of current 201 and an amount of current 202 obtained when the well resistors Rpt under the partial trenches are not used, for example, a rapid increase in the amount of current (inrush current) which flows when the power is turned on can be suppressed.

Next, a designing method of the semiconductor device in the present embodiment will be described. Here, the power switch in the present embodiment controls the delay characteristics (time constants) by performing a control regarding whether or not the contact electrode is disposed, and a control of the resistance values of the well resistors under the partial trenches, to thereby provide the time difference to the change in the threshold voltage caused by the change in the body potential among the plurality of the DtMOS transistors in the power switch. Therefore, in a physical layout of the power switch, by previously providing regions for disposing the contact electrodes which connect the gate electrodes of the transistors and the well, it is possible to easily perform the design by redesigning the position at which the contact electrode is disposed, and the width and the length of the partial trench, without doing the physical layout of the power switch again.

Figure 3:
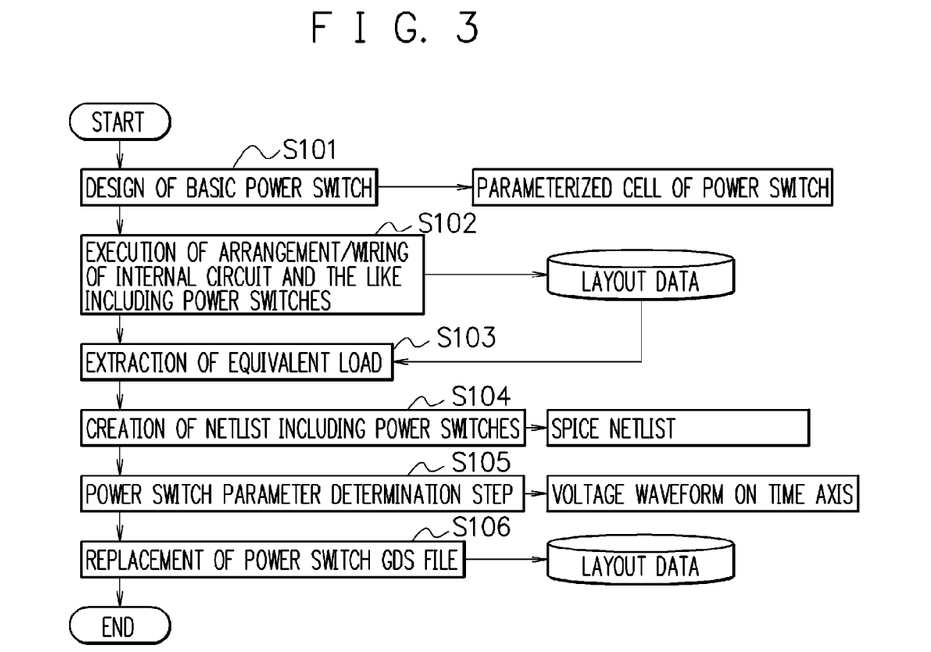
FIG. 3 is a flow chart illustrating an example of a designing method of the semiconductor device in the present embodiment.

FIG. 3 is a flow chart illustrating one example of the designing method of the semiconductor device in the present embodiment. First, in step S101, a design of basic power switch (parameterized cell) as illustrated in FIG. 4A and FIG. 4B is conducted.

Figure 4A:
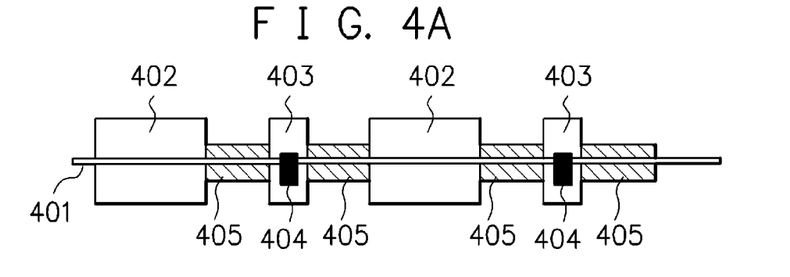
FIG. 4A is a schematic sectional view illustrating a structure of the power switch in the present embodiment.

FIG. 4A is a schematic sectional view illustrating a structure of a power switch. In FIG. 4A, 401 denotes a gate electrode, 402 denotes a region in which a source and a drain of a transistor are formed, and 403 denotes a region for disposing a contact electrode which connects the gate electrode 401 and a well in which the transistor is formed. 404 denotes the contact electrode which connects the gate electrode 401 and the well in which the transistor is formed, and 405 denotes an element isolation insulating film which is formed in a partial trench and which partially isolates (which does not completely isolate) the well in which the transistor is formed.

Figure 4B:
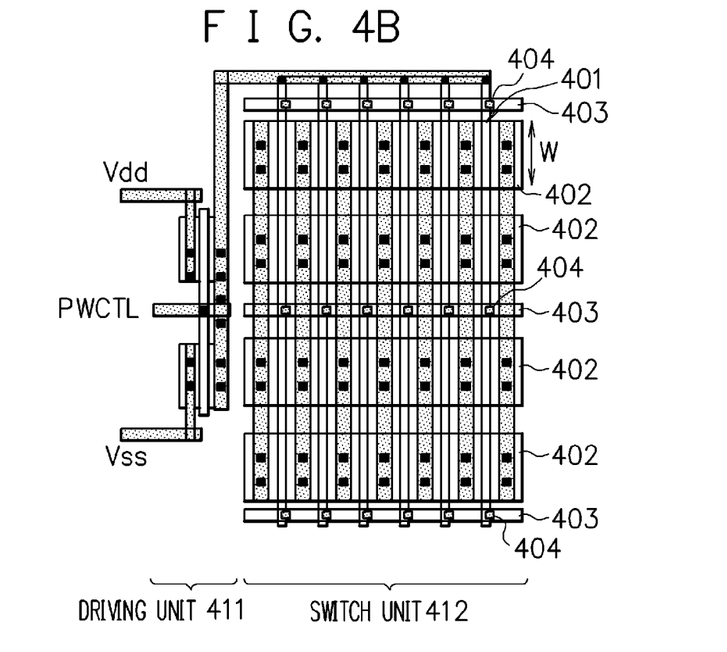
FIG. 4B is a diagram illustrating a layout image of the power switch in the present embodiment.

FIG. 4B is a diagram illustrating a layout image of the power switch. In FIG. 4B, components same as those illustrated in FIG. 4A are denoted by the same symbols. A driving unit 411 is an inverter having a gate into which the control signal PWCTL is input. The driving unit 411 supplies, in accordance with the control signal PWCTL, the power supply potential Vdd or the reference potential Vss to gate electrodes of respective transistors provided in a switch unit 412, to thereby drive the respective transistors provided in the switch unit 412.

The switch unit 412 has a plurality of DtMOS transistors. In the present embodiment, a channel length of one DtMOS transistor is set to about 1 μm, for example, and the DtMOS transistors are connected in 10 stages in a first direction (vertical direction, for example), and are connected in 20 stages in a second direction (horizontal direction, for example). The DtMOS transistors of 10 stages by 20 stages are set as a unit, and used according to need. Note that the example illustrated in FIG. 4B is one example, and the present embodiment is not limited to this.

In step S101, regarding the basic structure of the power switch as described above and the plurality of the DtMOS transistors provided in the switch unit 412, values as a result of performing parameterization regarding the presence/absence of the contact electrode on each row, and the width and the length of the partial trench, are prepared.

Figure 5:
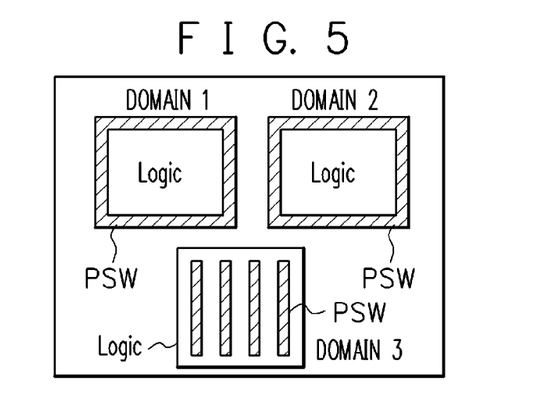
FIG. 5 is a diagram illustrating an example of arrangement of the power switches in the semiconductor device in the present embodiment.

Next, in step S102, a layout design regarding an arrangement and a wiring of an internal circuit and the like including power switches, is conducted. Here, the power switch is arranged in accordance with an electric power supply amount needed by a logic block corresponding thereto, and the arrangement and the wiring of the internal circuit and the like including the power switches are conducted. The arrangement of the power switch is appropriately selected, for each logic block (power domain), from an arrangement of power switch PSW surrounding a periphery of a logic block as one illustrated in FIG. 5 as an example, an arrangement of power switch PSW in a cross shape with respect to a logic block, an arrangement in a fishbone shape, and the like.

Figure 6:
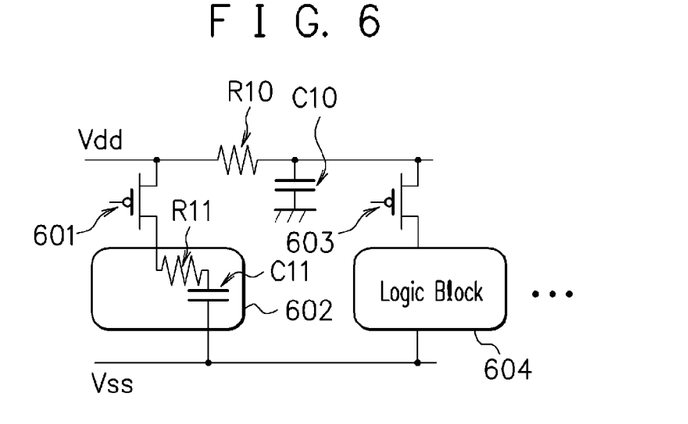
FIG. 6 is a diagram illustrating an example of extraction of equivalent load in the present embodiment.

Next, in step S103, an extraction of equivalent load in the logic block (power domain) is carried out based on layout data obtained by the layout design conducted in step S102. For example, as illustrated in FIG. 6, when a power switch 601 and a logic block (power domain) 602 are targeted, a load in the logic block (power domain) 602 is extracted as equivalent resistance R11 and capacitance C11, and a load with respect to the other power domains including a power domain 604 connected via a power switch 603 (load and the like by wiring) is extracted as equivalent resistance R10 and capacitance C10. Note that in the example illustrated in FIG. 6, since a resistance of the power line is very small when compared to an on-resistance at a moment at which the power switch 601 is turned on, the load is represented by a lumped constant, but, it is also possible that the load is represented finely without using the lumped constant.

Figure 7:
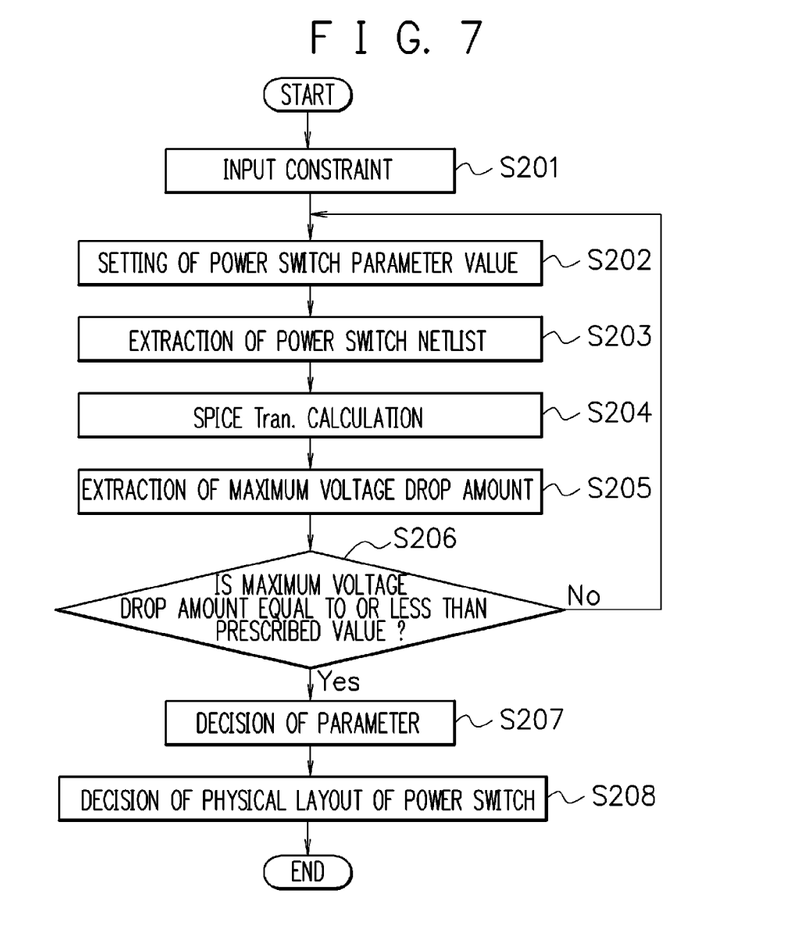
FIG. 7 is a flow chart illustrating an example of processing in steps S104 and S105 illustrated in FIG. 3.

Subsequently, in step S104, a netlist of the semiconductor device including the power switches is created based on the processing up to step 5103, and in step S105, a simulation of the power switch including a circuit to be a target is performed to decide a parameter related to the power switch. FIG. 7 is a flow chart illustrating an example of processing in steps S104 and S105. First, in step S201, a constraint regarding an amount of potential change in the power line Vdd caused by an inrush current is input. For example, a prohibition of potential reduction of 10% or more in the power line Vdd, is input as the constraint. Note that this is one example, and the constraint may be appropriately decided in accordance with a voltage sensitivity and the like of the other logic blocks (power domains).

Next, in step S202, a parameter value of the power switch is set, and in step S203, a netlist of the power switches is extracted. The parameter value of the power switch includes the position at which the contact electrode which connects the gate electrode and the well is disposed, or the width and the length of the partial trench. In step S204, a simulation of SPICE or the like is carried out, and in step S205, a maximum voltage drop amount is extracted when the power switch to be a target is switched from an off state to an on state.

Next, in step S206, it is determined whether or not the maximum voltage drop amount extracted in step S205 is equal to or less than a prescribed value based on the constraint set in step S201. When, as a result of the determination, it is determined that the maximum voltage drop amount extracted in step S205 is equal to or less than the prescribed value, the parameter value set in step S202 is decided, in step S207, as a parameter value of the power switch. In the step S208, a physical layout of the power switch is conducted to be decided in accordance with the parameter decided in step S207 including the position at which the contact electrode which connects the gate electrode and the well is disposed, or the width and the length of the partial trench.

On the other hand, when, as a result of the determination in step S206, it is determined that the maximum voltage drop amount extracted in step S205 is not equal to or less than the prescribed value, the process returns to step S202, and the processing of step S202 and thereafter is conducted again. Here, when it is determined that the maximum voltage drop amount extracted in step S205 is not equal to or less than the prescribed value, a new parameter value is set in step S202 by reducing the number of the contact electrode, or by narrowing the width of the partial trench so that the change in the threshold voltage of the transistor is delayed, for example.

Returning to FIG. 3, when the parameter related to the power switch is decided in step S105, a replacement of the layout data (GDS (Graphic Data System) file, for example) of the power switch is conducted in step S106, and the processing is terminated.

In the semiconductor device in the present embodiment, a footprint of the power switch is not changed, so that it is possible to extract, after doing the layout of the circuit including the power switch, a correct equivalent load from an actual layout. Therefore, it is possible to perform an optimum design, and there is no need to provide an unnecessary delay and the like, resulting in that a controllability of the supply/interruption of power with respect to each logic block (power domain) of the semiconductor device is improved. Although the power switch generally employs a multi-finger configuration since it needs a large driving force (small on-resistance), by controlling the presence/absence of the contact electrode which connects the gate electrode and the well, and the width and the length of the partial trench, it is possible to easily realize a power switch with an arbitrary current waveform.

Figure 8A:
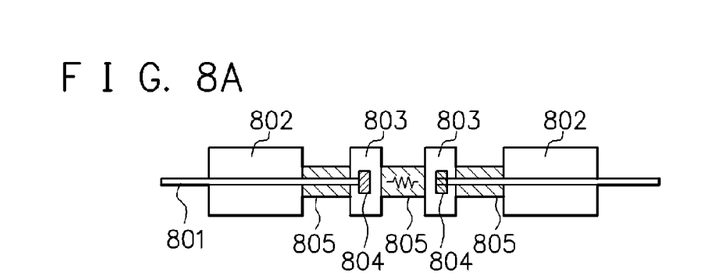
FIG. 8A and FIG. 8B are diagrams each illustrating another example of configuration of the power switch in the present embodiment.
Figure 8B:
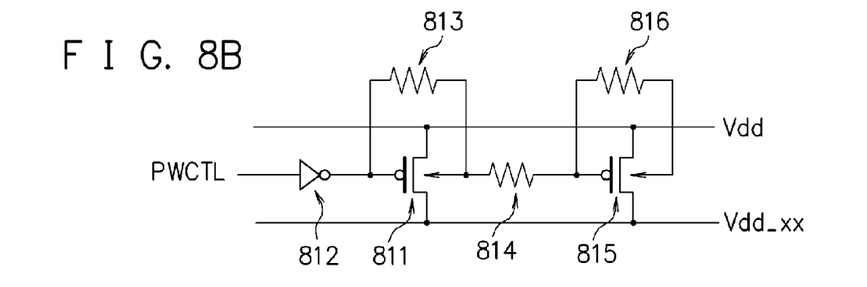
Figure 9A:
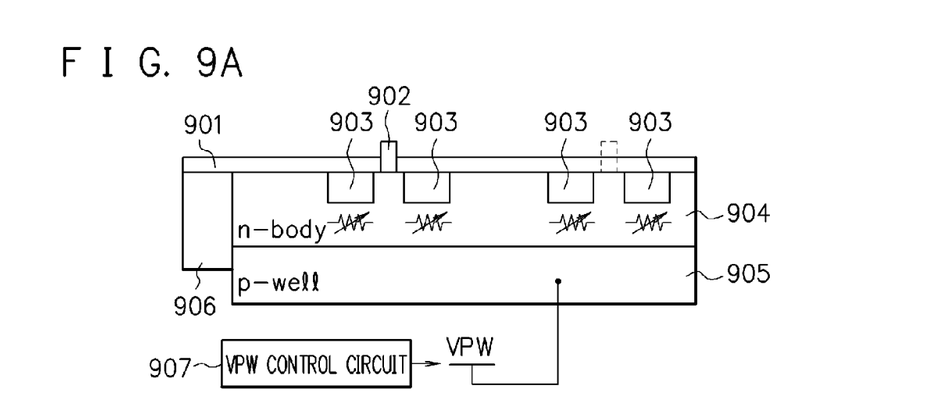
FIG. 9A and FIG. 9B are diagrams each illustrating still another example of configuration of the power switch in the present embodiment.
Figure 9B:
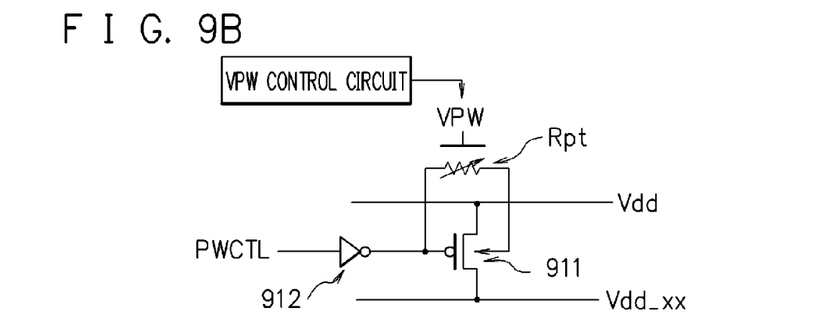

Note that the configuration of the power switch provided in the semiconductor device is not limited to the above-described configuration, and the power switch may also have a configuration as illustrated in FIG. 8A and FIG. 8B, or a configuration as illustrated in FIG. 9A and FIG. 9B, for example. FIG. 8A and FIG. 8B are diagrams each illustrating another example of configuration of the power switch in the present embodiment. In FIG. 8A, 801 denotes a gate electrode, 802 denotes a region in which a source and a drain of a transistor are formed, and 803 denotes a region on which a contact electrode which connects the gate electrode 801 and a well in which the transistor is formed can be disposed. 804 denotes the contact electrode which connects the gate electrode 801 and the well in which the transistor is formed, and 805 denotes an element isolation insulating film which is formed in a partial trench and which partially isolates (which does not completely isolate) the well in which the transistor is formed.

In the power switch illustrated in FIG. 8A, the gate electrodes 801 are separated, and the separated gate electrodes 801 are connected via well resistors under the partial trenches. Specifically, as a circuit example illustrated in FIG. 8B, the control signal PWCTL is supplied to a gate of a DtMOS transistor 811 via an inverter 812, and the gate and a body region of the DtMOS transistor 811 are connected via a well resistor 813 under a partial trench. Further, a gate of a DtMOS transistor 815 is connected to the gate of the DtMOS transistor 811 via well resistors 813 and 814 under partial trenches, and the gate and a body region of the DtMOS transistor 815 are connected via a well resistor 816 under a partial trench.

Out of a plurality of transistors in a general power switch, a transistor on a front stage side is connected in parallel with a transistor on a rear stage side, so that a driving force is sometimes too large, but, by separating the gate electrodes as illustrated in FIG. 8A, a resistance with respect to the rear stage side is enlarged to increase the RC delay, resulting in that a control width of the current (inrush current) which flows when the power is turned on, can be widened.

FIG. 9A and FIG. 9B are diagrams each illustrating another example of configuration of the power switch in the present embodiment. In FIG. 9A, 901 denotes a gate electrode, 902 denotes a contact electrode which connects the gate electrode 901 and an n body region 904 in which a transistor is formed. 903 denotes an element isolation insulating film which is formed in a partial trench and which partially isolates (which does not completely isolate) the n body region 904, 905 denotes a p well region 905 being a lower layer of the n body region 904, and 906 denotes an element isolation insulating film formed in a trench which completely isolates the n body region 904. Further, 907 denotes a VPW control circuit which controls a voltage VPW with respect to the p well region 905.

FIG. 9B is a diagram illustrating an example of circuit configuration of the power switch illustrated in FIG. 9A. In a DtMOS transistor 911, the control signal PWCTL is supplied to a gate thereof via an inverter 912, and the gate and a body region thereof are connected via a well resistor Rpt under the partial trench in which the element isolation insulating film 903 is formed. A resistance value of the well resistor Rpt is controlled in accordance with the voltage VPW controlled by the VPW control circuit 907.

In the power switch illustrated in FIG. 9A, the p well region 905 and the n body region 904 are formed by pn junction, so that by controlling the voltage VPW which is applied to the p well region 905, a thickness of a depletion layer between the p well region 905 and the n body region 904 can be controlled. As described above, by controlling the thickness of the depletion layer between the p well region 905 and the n body region 904, it is possible to control a resistance value of the well resistor under the partial trench in which the element isolation insulating film 903 is formed.

For example, by setting the voltage VPW to a voltage lower than the voltage Vdd, the depletion layer between the p well region 905 and the n body region 904 is enlarged, resulting in that the resistance value of the well resistor under the partial trench becomes high. Further, for example, by setting the voltage VPW to a voltage higher than the voltage Vdd, the resistance value of the well resistor under the partial trench becomes low. However, when the voltage VPW is set to the voltage higher than the voltage Vdd, since the pn junction of the p well region 905 and the n body region 904 is forward-biased, it is desirable to perform control within a range of capable of ignoring a leak current.

Further, in the power switch illustrated in FIG. 9A, since the resistance value of the well resistor under the partial trench can be controlled by the voltage VPW controlled by the VPW control circuit 907, even after a manufacture of the semiconductor device including the power switches, the resistance value can be controlled, and thus it is possible to control the inrush current when the power is turned on.

The designing method of the semiconductor device in the above-described embodiments can be realized when, for example, a computer having a CPU, an MPU, a RAM, a ROM, or the like, executes a program stored in the storage part, and the aforementioned program is embraced in the present embodiments. Further, the designing method of the semiconductor device in the above-described embodiments is realizable in such a manner that the program which causes a computer to operate to achieve the above-described functions is recorded in a recording medium such as, for example, a CD-ROM so as to have the computer read the program, and the recording medium recording the aforementioned program is embraced in the present embodiments. As the recording medium recording the aforementioned program, a flexible disk, a hard disk, a magnetic tape, a magneto-optical disk, a nonvolatile memory card, and so on can be used besides the CD-ROM.

Further, a program product realizing the functions in the above-described embodiments by the computer's execution and processing of the program is embraced in the present embodiments. The aforementioned program product includes the program itself realizing the functions of the above-described embodiments, and a computer into which the aforementioned program is read. Further, as the program product, there are a transmitting device which can provide the aforementioned program to a computer communicatably connected thereto via a network, a network system provided with this transmitting device, and the like.

Further, also in a case where the supplied program cooperates with an OS (operating system), other application software, or the like operating in the computer to realize the functions of the above-described embodiments, such a program is embraced in the present embodiments. Further, also in a case where all or a part of the processing of the supplied program is performed by a function expansion board or a function expansion unit of the computer to realize the functions of the above-described embodiments, such a program is embraced in the present embodiments. Further, all or a part of the program may be executed by a different computer in order to utilize the present embodiment in a network environment.

Figure 10:
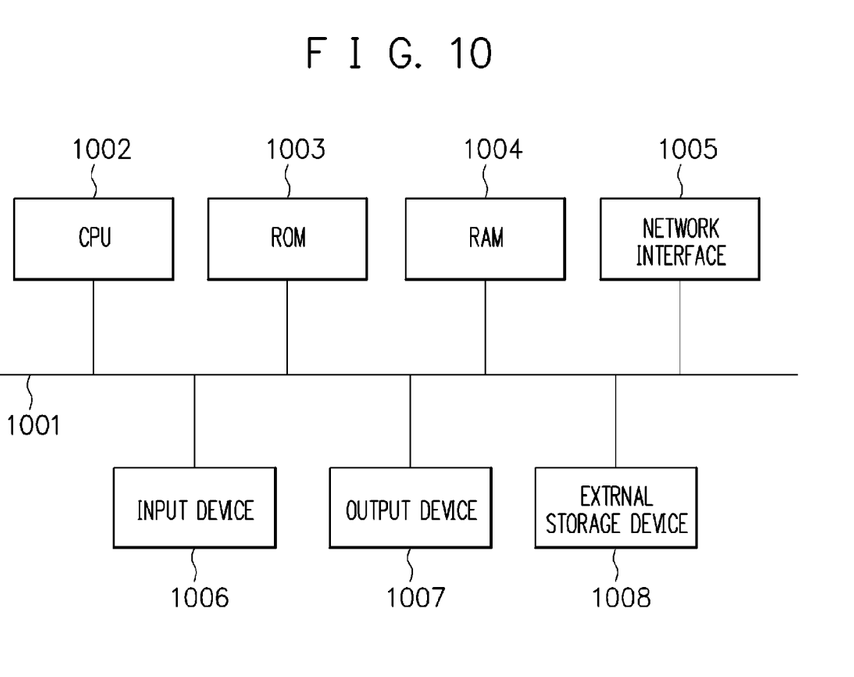
FIG. 10 is a diagram illustrating an example of configuration of a computer capable of realizing a designing method of the semiconductor device in the present embodiment.

For example, the designing method of the semiconductor device in the above-described embodiments can be realized by a computer (designing apparatus) as illustrated in FIG. 10, and by a CPU in the computer, the operations in the above-described embodiments are conducted. FIG. 10 is a diagram illustrating an example of configuration of the computer (designing apparatus) capable of realizing the designing method of the semiconductor device in the present embodiment. To a bus 1001, a CPU 1002, a ROM 1003, a RAM 1004, a network interface 1005, an input device 1006, an output device 1007, and an external storage device 1008, are connected.

The CPU 1002 performs processing and calculation of data, and controls respective components connected thereto via the bus 1001. In the ROM 1003, a boot program is stored in advance, and the computer is activated when the CPU 1002 executes the boot program. A computer program is stored in the external storage device 1008, and when the computer program is copied to the RAM 1004 and executed by the CPU 1002, each processing and the like of the designing method of the semiconductor device described above, for example, are carried out. The RAM 1004 is used as a work memory for performing input/output and transmission/reception of data, and as a temporary storage part for controlling the respective components.

The external storage device 1008 is, for example, a hard disk storage device, a CD-ROM or the like, and a storage content thereof is not lost even if the power is cut. The network interface 1005 is an interface used for being connected to a network. The input device 1006 is, for example, a keyboard, a pointing device (mouse) or the like, and can perform various types of designation, input and the like. The output device 1007 is a display, a printer or the like, and can perform a display, a printing or the like.

Note that the above-described embodiments merely illustrate concrete examples of implementing the present embodiment, and the technical scope of the present embodiment is not to be construed in a restrictive manner by these embodiments. That is, the present embodiment may be implemented in various forms without departing from the technical spirit or main features thereof.

The disclosed semiconductor device can provide a time difference to a change in a threshold voltage of a transistor caused by an electric potential applied to a body region in accordance with a signal of a gate electrode, among a plurality of transistors provided in a power switch, resulting in that an inrush current can be suppressed while suppressing an increase in a circuit area.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A semiconductor device, comprising:
   a plurality of logic blocks in which a power supply thereto is controlled; and
   a plurality of power switches each of which controls, for each logic block of the plurality of logic blocks, a supply and an interruption of power with respect to the each logic block, wherein
   each power switch of the plurality of power switches includes a plurality of transistors arranged in parallel between the each logic block and a power supply line of the power supply, each transistor of the plurality of transistors including a gate electrode connected to a well via a contact electrode, and a body region connected to a connection portion of the well with the contact electrode via a well resistor under an element isolation insulating film, having a delay characteristic which is a time constant based on a resistance value of the well resistor between the connection portion of the well with the contact electrode and the body region, and controlling a threshold voltage by changing an electric potential applied to the body region in accordance with a signal of the gate electrode, wherein the plurality of transistors include a plurality of first transistors having a first delay characteristic and a plurality of second transistors different from the plurality of first transistors having a second delay characteristic different from the first delay characteristic.

2. The semiconductor device according to claim 1, wherein
a resistance value of well resistors of the plurality of first transistors is different from a resistance value of well resistors of the plurality of second transistors.

3. The semiconductor device according to claim 1, wherein
the semiconductor is provided a plurality of first regions being disposed the contact electrodes each connecting the gate electrode of the each transistor and the well, wherein
the delay characteristics are adjusted by thinning out the contact electrodes disposed on the plurality of first regions.

4. The semiconductor device according to claim 1, wherein
the gate electrodes of adjacent transistors of the plurality of transistors are separated, and the separated gate electrodes are connected via well resistors under element isolation insulating films.

5. The semiconductor device according to claim 1, wherein:
the plurality of transistors provided in the each power switch are formed in a second well of a second conductivity type located on a first well of a first conductivity type; and
the semiconductor device further comprises a control circuit which controls a voltage applied to the first well.

* * * * *